United States Patent
Prasad et al.

(10) Patent No.: US 11,734,749 B2
(45) Date of Patent: Aug. 22, 2023

(54) ONLINE SHOPPING SYSTEM AND METHOD FOR SELECTING A WAREHOUSE FOR INVENTORY BASED ON PREDICTED AVAILABILITY AND PREDICTED REPLACEMENT MACHINE LEARNING MODELS

(71) Applicant: Maplebear, Inc., San Francisco, CA (US)

(72) Inventors: Shishir Kumar Prasad, Fremont, CA (US); Sharath Rao Karikurve, Berkeley, CA (US); Diego Goyret, Los Gatos, CA (US)

(73) Assignee: Maplebear Inc., San Francisco, CA (US)

( * ) Notice: Subject to any disclaimer, the term of this patent is extended or adjusted under 35 U.S.C. 154(b) by 49 days.

(21) Appl. No.: 17/230,816

(22) Filed: Apr. 14, 2021

(65) Prior Publication Data

US 2022/0335505 A1 Oct. 20, 2022

(51) Int. Cl.
*G06Q 30/0601* (2023.01)
*G06Q 10/087* (2023.01)
(Continued)

(52) U.S. Cl.
CPC ........... *G06Q 30/0639* (2013.01); *G06N 5/04* (2013.01); *G06N 20/00* (2019.01); *G06Q 10/087* (2013.01);
(Continued)

(58) Field of Classification Search
CPC .. G06Q 10/087; G06Q 10/08; G06Q 30/0205; G06Q 30/0623; G06Q 30/0222;
(Continued)

(56) References Cited

U.S. PATENT DOCUMENTS

| | | | |
|---|---|---|---|
| 5,727,164 A * | 3/1998 | Kaye | G06F 16/27 705/28 |
| 6,990,488 B1 * | 1/2006 | Chenault | G06Q 10/087 |

(Continued)

OTHER PUBLICATIONS

Pawar, Abhay, Predicting the real-time availability of 200 million grocery items Tech-at-instacart, Dec. 4, 2018 (Year: 2018).*

(Continued)

*Primary Examiner* — Scott L Jarrett
(74) *Attorney, Agent, or Firm* — Fenwick & West LLP

(57) ABSTRACT

An online concierge system allows users to order items from a warehouse having multiple physical locations, allowing a user to order items at any given warehouse location. To select a warehouse location for a warehouse selected by a user, the online concierge system identifies a set of items that the user has a threshold likelihood of purchasing from prior orders by the user. For each of a set of warehouse locations, the online concierge system applies a machine-learned item availability model to each item of the identified set. From the availabilities of items of the set at each warehouse location of the set, the online concierge system selects a warehouse location. The online concierge system identifies an inventory of items from the selected warehouse location to the user for inclusion in an order.

20 Claims, 7 Drawing Sheets

(51) Int. Cl.
  *G06Q 30/0204* (2023.01)
  *G06N 20/00* (2019.01)
  *G06Q 30/0201* (2023.01)
  *G06N 5/04* (2023.01)

(52) U.S. Cl.
  CPC ..... *G06Q 30/0201* (2013.01); *G06Q 30/0205* (2013.01); *G06Q 30/0619* (2013.01); *G06Q 30/0629* (2013.01); *G06Q 30/0633* (2013.01)

(58) Field of Classification Search
  CPC .... G06Q 30/00; G06Q 30/0601; G06Q 50/28; G06Q 20/203; G06Q 30/0641; G06Q 30/0631; G06Q 30/0633; G06Q 30/0639
  See application file for complete search history.

(56) References Cited

U.S. PATENT DOCUMENTS

| | | | | |
|---|---|---|---|---|
| 7,027,999 | B2* | 4/2006 | Smith | G06Q 10/087 705/7.31 |
| 7,233,909 | B2* | 6/2007 | Smith | G06Q 30/0202 705/7.29 |
| 7,321,863 | B2* | 1/2008 | Hartmann | G06Q 30/02 705/5 |
| 7,386,477 | B2* | 6/2008 | Fano | G06Q 30/0617 705/26.8 |
| 7,904,975 | B2* | 3/2011 | Kruglikov | G06Q 30/0617 5/28 |
| 8,386,323 | B1* | 2/2013 | Chenault | G06Q 30/06 705/28 |
| 8,392,261 | B2* | 3/2013 | Lee | G06Q 10/087 705/16 |
| 8,401,911 | B1* | 3/2013 | Chu | G06Q 20/18 705/26.7 |
| 8,666,846 | B1* | 3/2014 | Chenault | G06Q 10/08 705/28 |
| 8,738,461 | B1* | 5/2014 | Chu | G06Q 10/087 705/26.1 |
| 9,165,278 | B2* | 10/2015 | Vasantham | G06Q 10/087 |
| 9,230,234 | B2* | 1/2016 | Danzig | G06Q 10/087 |
| 9,355,400 | B1* | 5/2016 | Park | G06Q 30/00 |
| 9,741,007 | B1* | 8/2017 | Rouaix | G06Q 10/08 |
| 9,760,924 | B2* | 9/2017 | Cumberland | H04W 4/02 |
| 10,062,051 | B2* | 8/2018 | Waldman | G06Q 10/087 |
| 10,242,336 | B1* | 3/2019 | Agarwal | G06Q 10/083 |
| 10,438,164 | B1* | 10/2019 | Xiong | H04N 7/18 |
| 10,546,269 | B1* | 1/2020 | Gaurav | G06Q 10/087 |
| 10,586,273 | B1* | 3/2020 | Kohli | G06Q 30/0637 |
| 10,699,328 | B2* | 6/2020 | Rajkhowa | G06Q 10/083 |
| 10,776,848 | B2* | 9/2020 | Shiely | G06Q 30/0603 |
| 10,885,479 | B1* | 1/2021 | Reiss | G06Q 50/01 |
| 11,068,960 | B2* | 7/2021 | Xu | G06Q 30/0629 |
| 11,126,953 | B2* | 9/2021 | Smith | G06Q 10/067 |
| 11,222,374 | B1* | 1/2022 | Bell | G06Q 30/0629 |
| 11,270,372 | B2* | 3/2022 | Kumar | G06Q 30/0635 |
| 11,282,157 | B2* | 3/2022 | Bryan | B64C 39/024 |
| 11,308,536 | B1* | 4/2022 | Adler | G06Q 10/083 |
| 11,341,554 | B1* | 5/2022 | Sturm | G06Q 30/0235 |
| 11,468,493 | B2* | 10/2022 | Tate | G06Q 30/0641 |
| 11,544,810 | B2* | 1/2023 | Rao | G06Q 50/28 |
| 2002/0147631 | A1* | 10/2002 | Smith | G06Q 10/087 705/7.31 |
| 2002/0147651 | A1* | 10/2002 | Hoar | G06Q 30/0601 705/26.1 |
| 2002/0147657 | A1* | 10/2002 | Callender | G06Q 10/087 705/7.34 |
| 2003/0074349 | A1* | 4/2003 | Gupta | G06F 16/951 |
| 2004/0093274 | A1* | 5/2004 | Vanska | G06Q 30/0631 705/26.7 |
| 2006/0224439 | A1* | 10/2006 | Smith | G06Q 10/087 705/7.35 |
| 2007/0284440 | A1* | 12/2007 | Birmingham | G06Q 10/087 235/383 |
| 2013/0131971 | A1* | 5/2013 | Parrish | G06Q 30/0261 705/26.9 |
| 2014/0279294 | A1* | 9/2014 | Field-Darragh | G06Q 30/0282 705/28 |
| 2015/0100433 | A1* | 4/2015 | Choy | G06Q 30/0635 705/26.81 |
| 2015/0242918 | A1* | 8/2015 | Mccarthy | G06Q 30/0635 705/26.43 |
| 2016/0042315 | A1 | 2/2016 | Field-Darragh et al. | |
| 2016/0180284 | A1* | 6/2016 | Waldman | G06Q 30/0635 705/26.44 |
| 2018/0101884 | A1* | 4/2018 | Larman | G06Q 30/0633 |
| 2019/0080277 | A1* | 3/2019 | Trivelpiece | G06V 30/194 |
| 2019/0236740 | A1* | 8/2019 | Rao | G06N 20/20 |
| 2020/0043077 | A1* | 2/2020 | Turner | G06Q 30/0641 |
| 2020/0219171 | A1* | 7/2020 | Zhuang | G06Q 30/0635 |
| 2020/0380578 | A1* | 12/2020 | Xu | G06Q 30/0629 |
| 2020/0394697 | A1* | 12/2020 | Paolella | G06Q 30/0623 |
| 2021/0312526 | A1* | 10/2021 | Xu | G06N 20/00 |
| 2022/0044299 | A1* | 2/2022 | Tate | G06F 16/9538 |
| 2022/0092680 | A1* | 3/2022 | Defrancesco | G06Q 10/087 |
| 2022/0101250 | A1* | 3/2022 | Wang | G06Q 50/30 |
| 2022/0114640 | A1* | 4/2022 | Pawar | G06Q 30/0282 |
| 2022/0237675 | A1* | 7/2022 | Montague | G06Q 30/0643 |
| 2022/0237679 | A1* | 7/2022 | Tenneti | G06Q 30/0617 |
| 2022/0292567 | A1* | 9/2022 | Prasad | G06Q 10/087 |
| 2022/0292580 | A1* | 9/2022 | Putrevu | G06Q 10/06315 |
| 2022/0414746 | A1* | 12/2022 | Tate | G06Q 30/0603 |

OTHER PUBLICATIONS

The story behind an Instacart order, part 3: predicting the shop Instacart.com, May 8, 2019 (Year: 2019).*
The story behind an Instacart order, Part 2: Browsing and Buying Instacart.com, Oct. 16, 2019 (Year: 2019).*
McCreight, Gordon, The story behind an Instacart order, Part 1: building a digital catalog Instacart.com, May 8, 2019 (Year: 2019).*
Ye, Andre, How Instacart Uses Data Science to Tackle Complex Business Problems Towards Data Science, Mar. 30, 2020 (Year: 2020).*
Rao, Sharath et al., The Algorithms That Make Instacart Roll IEEE Spectrum, Mar. 2021 (Year: 2021).*
Mixson, Elizabeth, Instacart: Delivering Incredible Customer Experiences with Advanced Analytics and Machine Learning AI Data & Analytics Network, Mar. 16, 2021 (Year: 2021).*
Oracle Retail Advanced Inventory Planning—Order Management User Guide—Release 15.0 Oracle, Dec. 2015 (Year: 2015).*
Canadian Intellectual Property Office, Office Action, Canadian Patent Application No. 3,117,183, dated May 19, 2023, 4 pages.

* cited by examiner

ONLINE SHOPPING SYSTEM AND METHOD FOR SELECTING A WAREHOUSE FOR INVENTORY BASED ON PREDICTED AVAILABILITY AND PREDICTED REPLACEMENT MACHINE LEARNING MODELS

BACKGROUND

This disclosure relates generally to ordering an item through an online concierge system, and more specifically to selecting a specific location of a warehouse from which an inventory of available items is displayed to a user.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Many warehouses have multiple physical locations which may have different items available at different times. For example, certain items offered by a warehouse are available at a specific location, while another location of the warehouse does not have the certain items available. This variance in items available at different locations of a warehouse affects an inventory of items an online concierge system displays to a user for selecting items to include in an order.

When a conventional online concierge system receives a selection of a warehouse from a user for creating an order, the conventional online concierge system identifies a location of the warehouse physically closest to a location identified by the order. For example, the online concierge system determines physical distances between locations of the warehouse and the location identified by the order and selects a location of the warehouse having a minimum distance to the location identified by the order. While using distance between locations of a warehouse and a location identified by the order allows an online concierge system to reduce distance travelled by a shopper fulfilling the order, conventional online concierge systems do not account for availability of items at different warehouse locations. By failing to account for availability of items at different locations of a warehouse, the online concierge system may identify items available at a location of the warehouse that is not best able to fulfill the order from the user.

SUMMARY

When a user of the online concierge system accesses the online concierge system, the online concierge system identifies one or more warehouses from which the user may select items for inclusion in an order. The user selects a warehouse and subsequently identifies one or more items offered by the warehouse for inclusion in an order. A warehouse offering items for inclusion in an order received by the online concierge system may have multiple locations offering items. For example, a warehouse that is a supermarket has a plurality of locations each corresponding to different physical stores. When a user selects a warehouse having multiple locations, the online concierge system selects a location of the warehouse and identifies an inventory of items available at the selected location of the warehouse from which the user selects items via the online concierge system. As different locations of the warehouse may have different inventories of items available at different times, which location of the warehouse the online concierge system 102 selects affects which items are available for the user to include in an order.

To select a location of a warehouse having multiple locations when the online concierge system receives a selection of a warehouse, the online concierge system identifies locations of the warehouse that are within a threshold distance of a location identified by the selection. In various embodiments, the online concierge system determines the location identified by the selection from a location stored by the online concierge system in association with the user, such as an address or another physical location included in a user profile maintained for the user by the online concierge system. As another example, the online concierge system receives an input from the user specifying a location along with the selection of the warehouse by the user. The online concierge system retrieves locations of the selected warehouse, such as addresses of locations of the selected warehouse. The online concierge system determines distances between various locations of the selected warehouse and the location identified by the selection and identifies locations of the selected warehouse that do not exceed a threshold distance of the location identified by the selection. This allows the online concierge system to identify locations of the selected warehouse that limit an amount of travel for a shopper to fulfill an order from the selected warehouse, decreasing potential order fulfillment time and reducing resources expended for a shopper to travel to fulfill an order.

To account for differing availability of items in different identified locations of the selected warehouse, the online concierge system leverages information about items previously ordered by the user. Hence, the online concierge system retrieves orders previously received from the user, with each of the retrieved orders including one or more items. From the items included in the previously received orders, the online concierge system selects a set of items. In some embodiments, the online concierge system maintains a trained purchase model that receives inputs an identifier of the user, an identifier of an item, and a time. The trained purchase model outputs a probability of the user corresponding to the identifier of the user purchasing an item corresponding to the identifier of the item at the time. The trained purchase model accounts for times when the user previously purchased an item, such as a relative time from when the user previously purchased the item to a time when the model is applied, as well as characteristics of the item (e.g., a type of the item, a quantity or an amount of the item that was previously purchased). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user. The trained purchase model may be trained using any suitable method or combination of methods (e.g., supervised learning, unsupervised learning, semi-supervised learning, etc.).

The online concierge system applies the trained purchase model to items included in orders previously received from the user, determining a probability of the user purchasing different items included in orders previously received from the user. In some embodiments, the online concierge system applies the trained purchase model to each item included in at least one order previously received from the user. Alternatively, the online concierge system identifies a set of orders previously received from the user, such as orders received within a specific time interval (e.g., within a threshold amount of time from a time when the trained purchase model is to be applied). From the probabilities of the user purchasing different items included in orders previously received from the user, the online concierge system selects the set of items. In some embodiments, the online concierge system ranks items included in prior orders based on the probabilities of the user purchasing the different items and selects the set of items as items having at least a threshold position in the ranking. Alternatively, the online concierge system selects the set of items as items having at least a threshold probability of being purchased by the user.

The online concierge system uses the selected set of items to identify a location of the selected warehouse. For each identified location of the selected warehouse, the online concierge system determines a predicted availability of each item of the set by applying a machine-learned item availability model to each item of the set in combination with an identified location of the selected warehouse. Application of the machine-learned item availability to the combination of an item and the identified location of the selected warehouse generates a predicated availability of the item that is a probability of the item being availability at the identified location of the selected warehouse. From the predicted availability determined for each item of the set at the identified location of the selected warehouse, the online concierge system generates an availability value for the identified location of the selected warehouse. In some embodiments, the online concierge system averages the predicted availability for each item of the set at the identified location of the selected warehouse. The online concierge system may apply a weight to predicted availabilities for items of the set, with a weight applied to the predicted availability for an item of the set based on a frequency of prior orders including the item of the set or based on a number of prior orders including the item of the set; using the weighted predicted availabilities of items in the set, the online concierge system generates the availability value for the identified location of the selected warehouse (e.g., by averaging the weighted predicted availabilities of items in the set). In other embodiments, the online concierge system sums the precited availabilities for items of the set at the identified location of the selected warehouse to generate the availability value for the identified location of the selected warehouse; weights may be applied to the predicated availabilities for items of the set at the identified location of the selected warehouse and the online concierge system sums the weighted predicated availabilities for items of the set at the identified location of the selected warehouse to generate the availability value for the identified location of the selected warehouse.

Based on availability values generated for each of the identified locations of the selected warehouse, the online concierge system determines a selected identified location of the selected warehouse. In various embodiments, the online concierge system determines the selected identified location of the selected warehouse as an identified location of the selected warehouse having a maximum availability value. Hence, the online concierge system uses the availability values for different identified locations of the selected warehouse that is most likely to have items of the set of items available for purchase. As the items of the set were selected based on prior orders of the user, the selected identified location of the selected warehouse has a highest likelihood of having items that the user is likely to include in orders available for purchase. The online concierge system retrieves an inventory of items available from the selected identified location of the selected warehouse.

Responsive to the online concierge system being unable to retrieve previously received orders for the user, the online concierge system retrieves stored information identifying rates at which items included in previously received orders from other users were successfully purchased from each of the identified locations of the selected warehouse. For example, the online concierge system determines orders received from other users within a specific time interval (e.g., within a week of receiving the selection of the warehouse from the user) and that have been fulfilled from different locations of the selected warehouse. From the determined orders received form the other users, the online concierge system determines a rate at which items included in the determined orders were purchased from different locations of the selected warehouse. For example, for an item, the online concierge system calculates a number of orders fulfilled at an identified location of the selected warehouse that included the item and a number of orders fulfilled at the identified location of the selected warehouse for which the item was purchased, with the rate of the item being found at the identified location of the selected warehouse being a ratio of the number of orders fulfilled at the identified location of the selected warehouse for which the item was purchased to the number of orders fulfilled at an identified location of the selected warehouse that included the item. Based on rates at which different items were found at different identified locations of the selected warehouse, the online concierge system determines the selected identified location of the warehouse. For example, the online concierge system aggregates (e.g., sums) rates at which different items were found across orders fulfilled at different physical locations of the selected warehouse and determines the selected identified location of the warehouse as an identified location of the warehouse having a maximum aggregated rate at which different items were found. As another example, the online concierge system averages rates at which different items were found across orders fulfilled at different physical locations of the selected warehouse and determines the selected identified location of the warehouse as an identified location of the warehouse having a maximum average rate at which different items were found. Hence, the online concierge system leverages information about rates at which items included in orders are successfully purchased from different identified locations of the selected warehouse to determine the selected identified location of the warehouse when the online concierge system has not received orders from the user. As the online concierge system receives orders from the user, the online concierge system, determines the selected identified location of the warehouse from items previously ordered by the user, as further described above.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
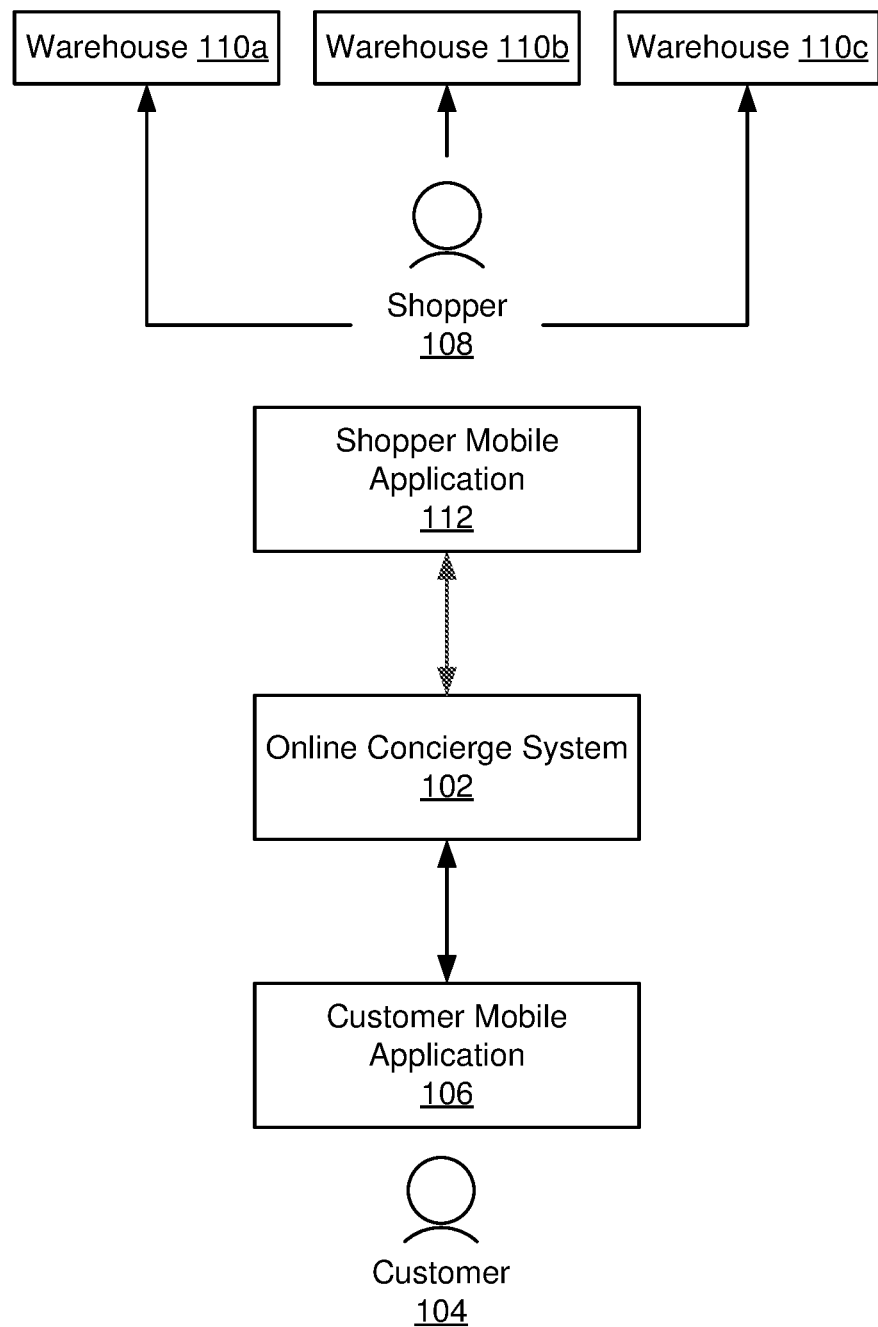
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
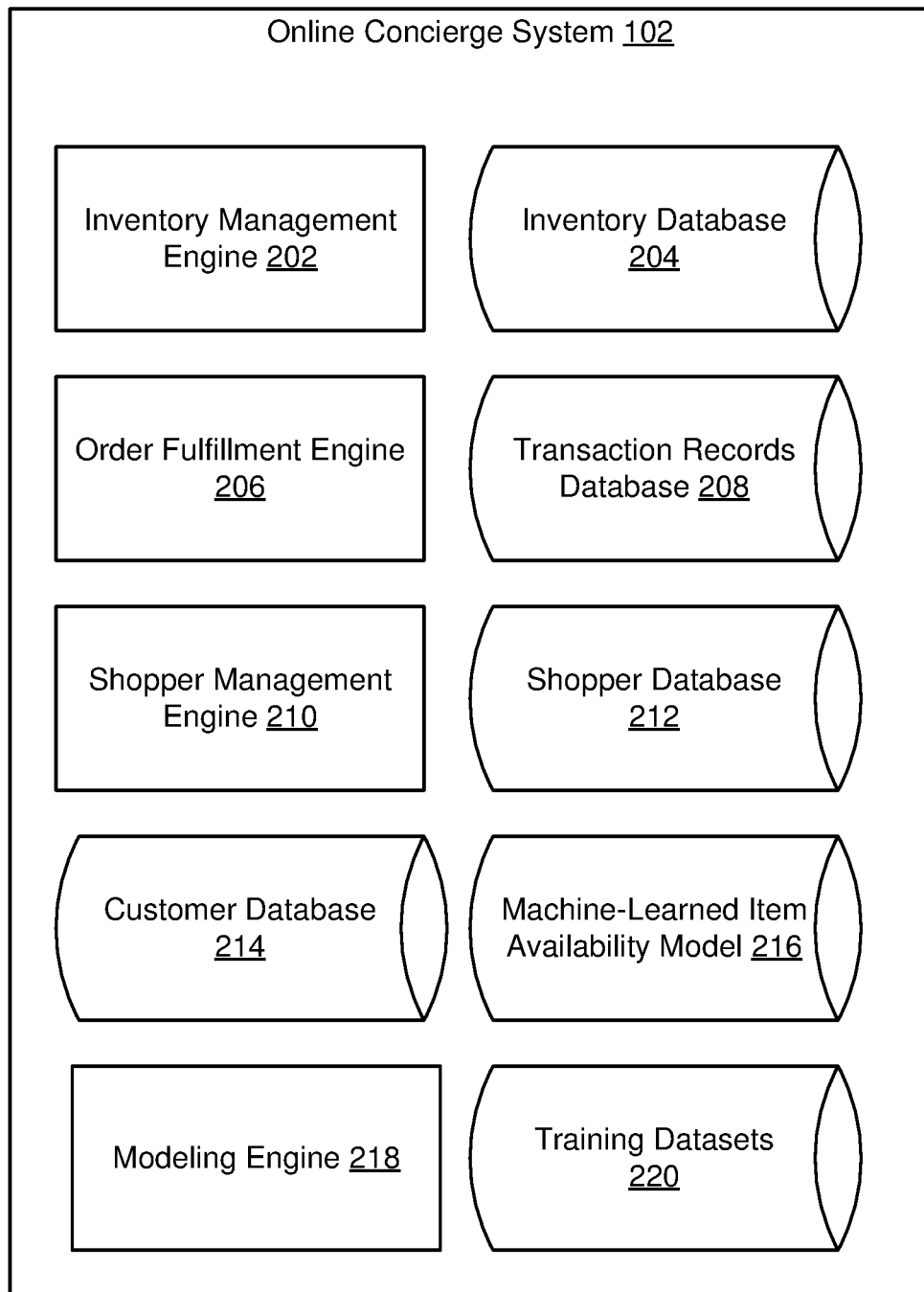
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIGS. 4 and 5.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 selects a location of a warehouse 110 having multiple locations for which an inventory is retrieved for selection of items for an order. As a warehouse 110 may have different locations in different physical locations that have different inventories, the location of the warehouse 110 from which an inventory is retrieved affects items available to a user to include in an order. To increase a likelihood of the order fulfillment engine 206 selecting a location of a warehouse 110 most likely to have items likely to be included in an order by a user, the order fulfillment engine 206 leverages items included in orders previously received from the user to select a location of the warehouse 110 within a threshold distance of a location provided by the user. As further described below in conjunction with FIG. 6, the order fulfillment engine 206 identifies a set of items form items included in orders previously received from the user and determines a probability of each item of the set being available at each location of the warehouse 110 within the threshold distance of the location provided by the user. From the probabilities of items of the set being available at different locations of the warehouse 110 within the threshold distance of the location provided by the user, the order fulfillment engine 206 selects a location of the warehouse 110 having a maximum probability of items of the set being available and retrieves an inventory of items available at the selected location of the warehouse 110, as further described below in conjunction with FIG. 6.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model, further described below in conjunction with FIG. 6. The trained purchase model receives inputs an identifier of the user, an identifier of an item, and a time. and outputs a probability of the user corresponding to the identifier of the user purchasing an item corresponding to the identifier of the item at the time. The trained purchase model accounts for times when the user previously purchased an item, such as a relative time from when the user previously purchased the item to a time when the model is applied, as well as characteristics of the item (e.g., a type of the item, a quantity or an amount of the item that was previously purchased). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108, as described in further detail with reference to FIG. 5. Following updating of the training datasets 220, a modeling engine 218 may retrain a model with the updated training datasets 220 and produce a new machine-learned item availability model 216.

Customer Mobile Application

Figure 3A:
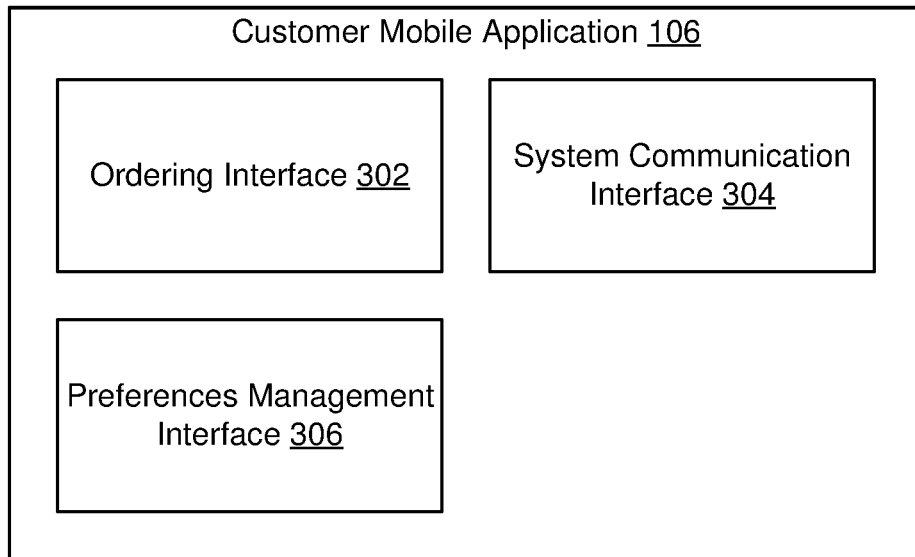
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
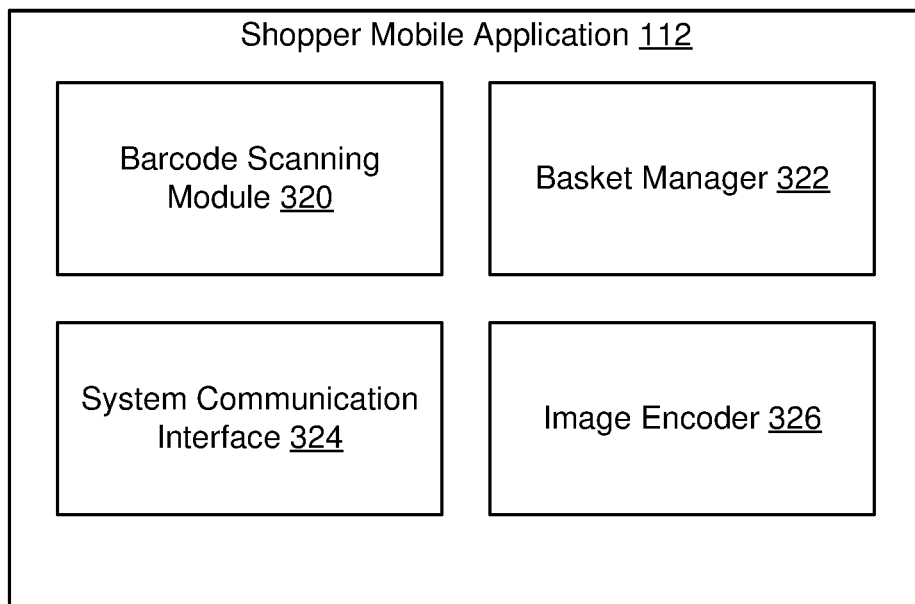
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
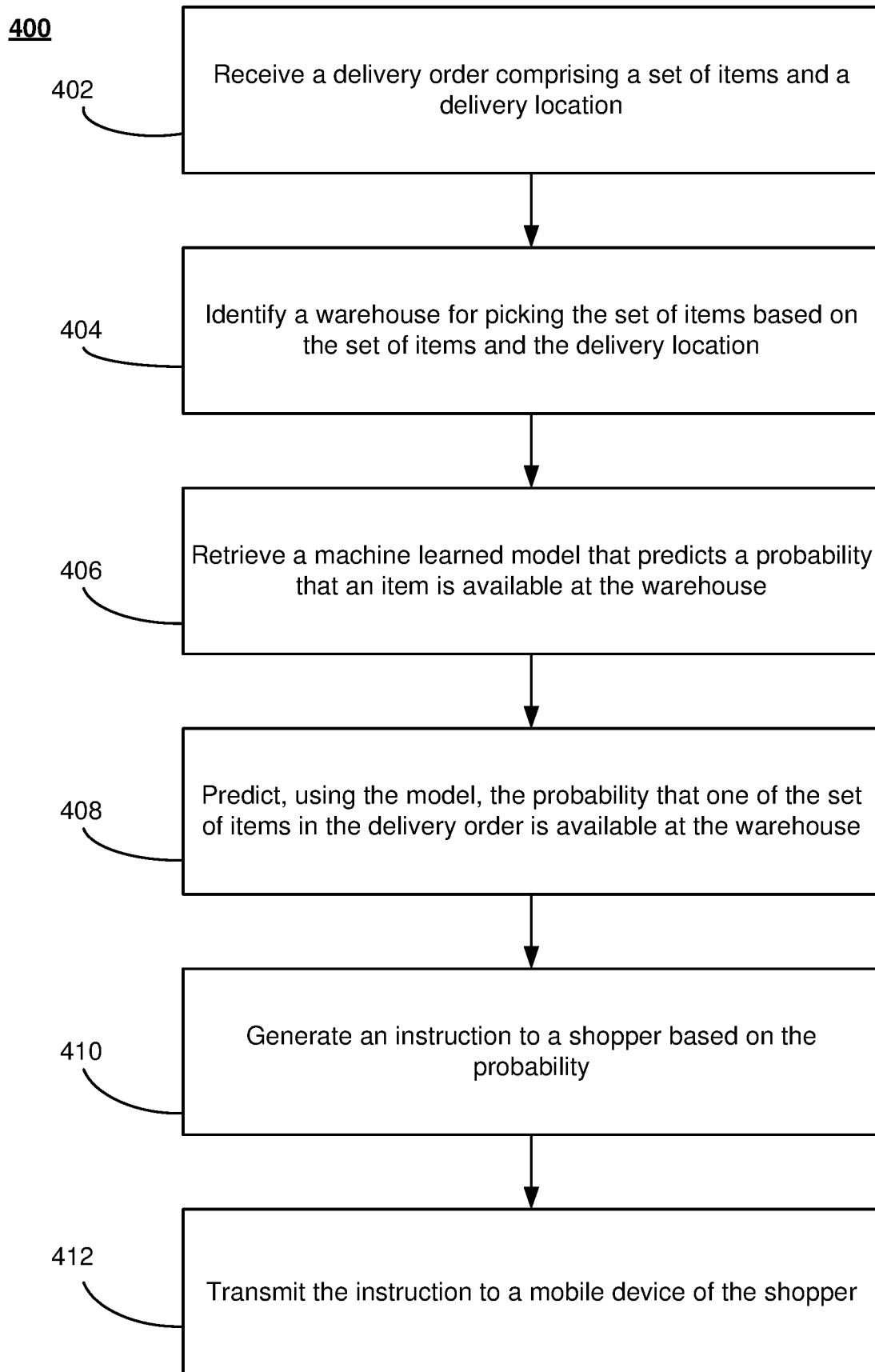
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a user based on the probability predicted by the machine-learned item availability model 216.

Updating the Training Datasets

Figure 5:
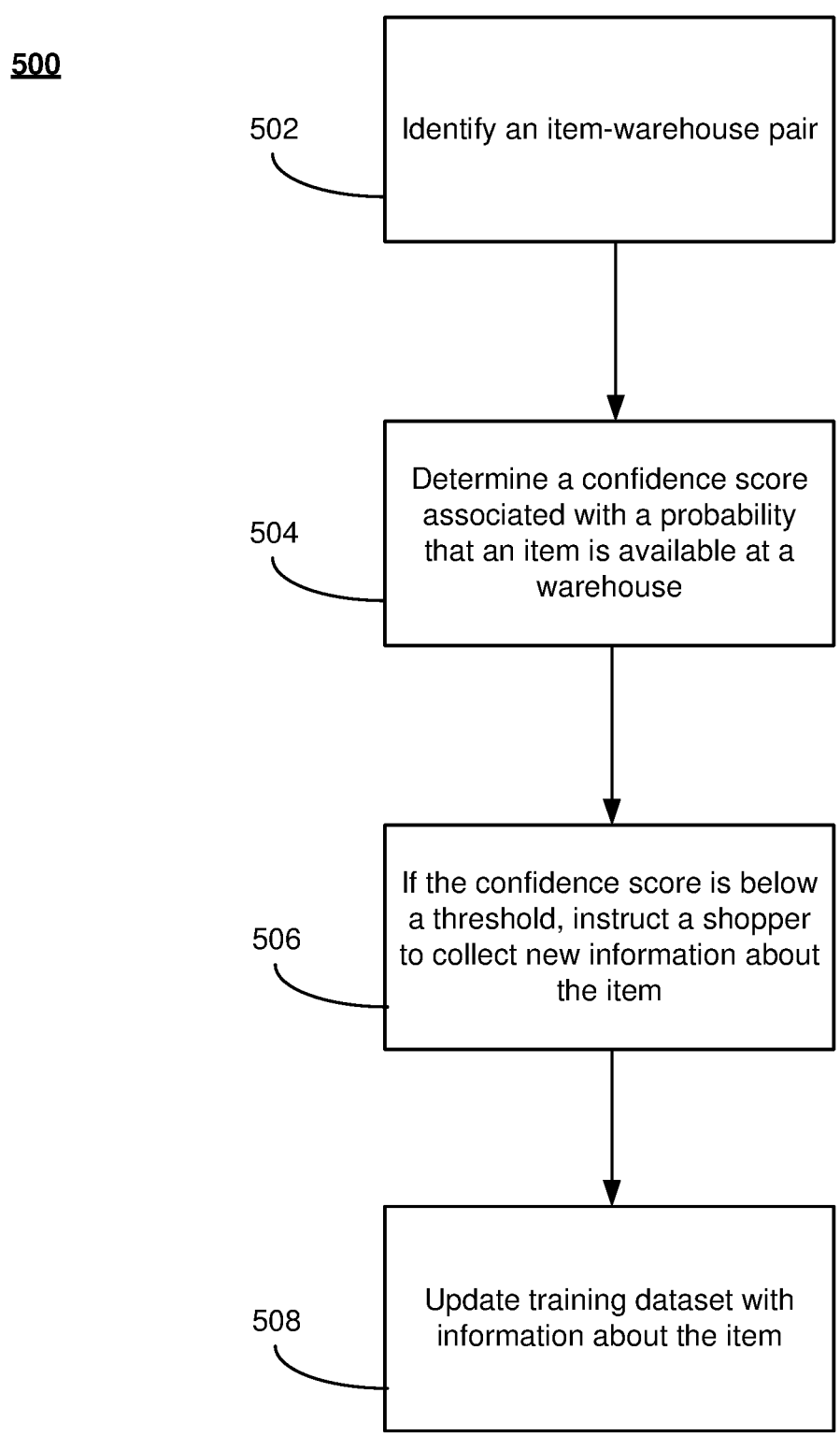
FIG. 5 is a flowchart of a process for updating training datasets for a machine-learned model, according to one embodiment.

FIG. 5 is a flowchart illustrating a process 500 for updating training datasets for a machine-learned model, according to one embodiment. The training datasets may be the training datasets 220 as shown in FIG. 2. While the training datasets 220 include large datasets of information collected from previous delivery orders (e.g., information identifying items and whether the items were available at a warehouse), certain items or warehouses might have less information associated with them in the training datasets 220 than other items or warehouses. For example, if an item is not frequently ordered, or has not been ordered for a long period of time, then it may be more difficult to build an accurate availability prediction in the machine-learned item availability model 216. One way to improve the ability of the machine-learned item availability model 216 to accurately predict item availability is to increase the information about the item in the training datasets 220 and add new information. With larger and/or more recent datasets on the item, the modeling engine 218 can build more statistically meaningful connections between the machine-learning factors described with reference to FIG. 2 and the predicted item availability.

Process 500 thus improves the machine-learned item availability model 216 by increasing the datasets for particular items in the training datasets 220 with low confidence scores. Process 500 may be carried out by the online concierge system 102, e.g., by the inventory management engine 202 in conjunction with the shopper management engine 210, the item availability model 216, and the modeling engine 218. In some examples, process 500 is carried out by the online concierge system 102 following retrieving 406 a machine-learned model that predicts a probability that an item is available at a warehouse, as described in FIG. 4.

The online concierge system 102 (e.g., the inventory management engine 202 using the item availability model 216) identifies 502 an item-warehouse pair. For example, the item and warehouse in the item-warehouse pair may be an item in a received order and warehouse or potential warehouse for picking the items from the received order, e.g., to evaluate the suitability of the warehouse or likelihood of successfully picking the order before the order is picked.

As another example, the item-warehouse pair may be identified from items for which the availability predicted by the machine-learned item availability model 216 was incorrect (e.g., the item was predicted to be available and was determined by the shopper to be out of stock, or the item was predicted to be unavailable and the shopper was able to find it in the warehouse). For items for which the availability prediction was incorrect, the online concierge system 102 may determine if the items have sufficient associated information within the training datasets 220. If the online concierge system 102 determines that the incorrect probability was a result of insufficient or stale information in the training datasets 220, it may identify item-warehouse pairs and carry out process 500 to update the training datasets 220.

Additionally, or alternatively, item-warehouse pairs are identified from new items offered by the online concierge system 102. For new items, there may not be previous delivery order information relating the item availability to item characteristics, delivery order information, or time information in the training datasets 220. The lack of previous delivery orders may lead to a low confidence score for new items. The inventory management engine 202 may initiate the process 500 for new items until sufficient information about the items are collected in the training datasets 220 to improve the item availability confidence score associated with the items.

The online concierge system 102 (e.g., the inventory management engine 202 using the machine-learned item availability model 216) inputs the item, warehouse, and timing characteristics for the identified item-warehouse pair into the machine-learned item availability model 216 and determines 504 a confidence score associated with a probability that an item is available at the warehouse. The online concierge system 102 may determine probabilities and/or confidence scores for all or selected items in an inventory, e.g., items that are expected to be picked based on already-received orders, sales, promotions, holidays, weather, historical trends, or other factors. The confidence score is generated along with the item availability probability (also referred to as "availability") by the machine-learned item availability model 216. The confidence score may be an error associated with the availability probability. The confidence score indicates items that may not have enough training data in the training datasets 220 to generate a statistically significant link between the item's availability and information from the delivery order and/or item characteristics. In some alternate embodiments, the online concierge system 102 may identify, using the item availability model 216, item-warehouse pairs with a low confidence score, e.g., all item-warehouse pairs with a confidence score below a particular threshold. This list of item-warehouse pairs may be filtered, e.g., based on item popularity, predicted items to be ordered, warehouse, or one or more other factors.

In response to the determined confidence level of an item-warehouse pair being below a threshold, the online concierge system 102 (e.g., the shopper management engine 210) instructs 506 the shopper to collect new information about items with a confidence score below a threshold. A confidence score threshold may be an item availability probability between 0 and 1. A threshold confidence score may be 0.3, such that in response to a confidence score below 0.3, the shopper is instructed to collect new information about an item. In some embodiments, the online concierge system 102 also considers the availability probability for the item-warehouse pair. For example, if an item-warehouse pair has a confidence level slightly below the threshold, but a very low or very high availability probability, the online concierge system 102 may determine not to collect new information about the item-warehouse pair. In some embodiments, the threshold used for the confidence score may depend on the availability probability, or vice versa.

In response to the instruction, the shopper 108 determines whether the item is available at the warehouse. The shopper may be instructed to try to find the item at the warehouse, and indicate, through the SMA 112, whether the item is available. This information is transmitted to the online concierge system 102 via the shopper management engine 210 and used to update 508 the training datasets 220. In some embodiments, a shopper may be given a list of items with low confidence scores to seek within the warehouse. The online concierge system 102 updates 508 the training dataset 220 with new information about the item, which includes whether or not the item is available in the warehouse, and any additional item characteristics, warehouse information, or time information as described with respect to FIG. 2. The online concierge system 102 also updates the inventory database 204 based on the received information; e.g., if the inventory database 204 stores the time at which the item was most recently found or not found, this time will be updated based on the input from the shopper 108. In response to the new information collected by the shopper, the modeling engine 218 may update or retrain the machine learning item availability model 216 with the updated training datasets 220. Process 500 may be carried out by the online concierge system 102 until a confidence score associated with a probability that an item is available is above a threshold.

Figure 6:
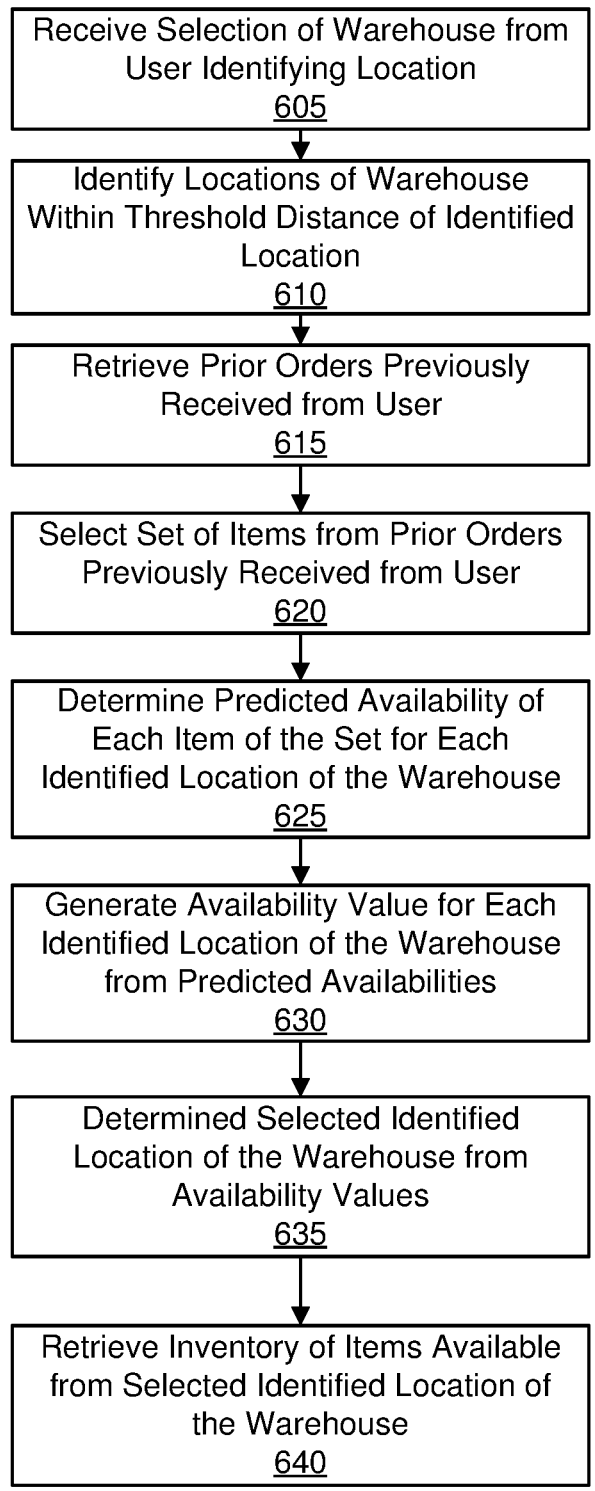
FIG. 6 is a flowchart of a method for selecting a location of a warehouse for a user of an online concierge system to select items for inclusion in an order, according to one embodiment.

Selecting a Location of a Warehouse from which a User Selects Items for an Order FIG. 6 is a flowchart of one embodiment of a method for selecting a location of a warehouse 110 for a user of an online concierge system 102 to select items for inclusion in an order. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments.

When a user of the online concierge system 102 accesses the online concierge system 102, the online concierge system 102 identifies one or more warehouses 110 from which the user may specify items for an order. The user selects a warehouse 110 and subsequently identifies one or more items offered by the warehouse 110 for inclusion in an order. As further described above in conjunction with FIGS. 1-3B, a shopper selects the order from the online concierge system 102, obtains the items included in the order from the warehouse 110, and delivers the items to an address specified by the user, such as an address included in the order.

A warehouse 110 offering items for inclusion in an order received by the online concierge system 102 may have multiple locations offering items. For example, a warehouse 110 that is a supermarket has a plurality of locations each corresponding to different physical stores. When a user selects a warehouse 110 having multiple locations, the online concierge system 102 selects a location of the warehouse 110 and identifies an inventory of items available at the selected location of the warehouse 110 from which the user selects items via the online concierge system 102. As different locations of the warehouse 110 may have different inventories of items available at different times, which location of the warehouse 110 the online concierge system 102 selects affects which items are available for the user to include in an order.

To select a location of a warehouse 110 having multiple locations when the online concierge system 102 receives 605 a selection of a warehouse 110, the online concierge system 102 identifies 610 locations of the warehouse 110 that are within a threshold distance of a location identified by the selection. In various embodiments, the online concierge system 102 determines the location identified by the selection from a location stored by the online concierge system 102 in association with the user, such as an address or another physical location included in a user profile maintained for the user by the online concierge system 102. As another example, the online concierge system 102 receives an input from the user specifying a location along with the selection of the warehouse 110 by the user. The online concierge system 102 retrieves locations of the selected warehouse 110, such as addresses of locations of the selected warehouse. The online concierge system 102 determines distances between various locations of the selected warehouse 110 and the and the location identified by the selection and identifies 610 locations of the selected warehouse 110 that do not exceed a threshold distance of the location identified by the selection. This allows the online concierge system 102 to identify 610 locations of the selected warehouse 110 that limit an amount of travel for a shopper to fulfill an order from the selected warehouse 110, decreasing potential order fulfillment time and reducing resources expended for a shopper to travel to fulfill an order. In other embodiments, the online concierge system 102 may use alternative criteria to identify 610 locations of the selected warehouse. For example, the online concierge system 102 maintains different geographic regions and identifies 610 locations of the selected warehouse 110 that are within a geographic region including the location identified by the selection. As an example, the online concierge system 102 maintains different geographic regions that each correspond to a zip code and identifies 610 locations of the selected warehouse 110 that are within a geographic region corresponding to a zip code included in the location identified by the selection.

To account for differing availability of items in different identified locations of the selected warehouse 110, the online concierge system 102 leverages information about items previously ordered by the user. Hence, the online concierge system 102 retrieves 615 orders previously received from the user, with each of the retrieved orders including one or more items. From the items included in the previously received orders, the online concierge system 102 selects 620 a set of items. In some embodiments, the online concierge system 120 determines a frequency with which the user purchased each item included in at least one previously received order and selects 620 the set of items as items having at least a threshold frequency of purchase. As another example, the online concierge system 102 ranks items from the previously received orders based on their corresponding frequency of purchase and selects 620 the set of items as items having at least a threshold position in the ranking.

In other embodiments, the online concierge system 102 maintains a trained purchase model that receives inputs an identifier of the user, an identifier of an item, and a time. The trained purchase model outputs a probability of the user corresponding to the identifier of the user purchasing an item corresponding to the identifier of the item at the time. The trained purchase model accounts for times when the user previously purchased an item, such as a relative time from when the user previously purchased the item to a time when the model is applied, as well as characteristics of the item (e.g., a type of the item, a quantity or an amount of the item that was previously purchased). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user. The trained purchase model may be trained using any suitable method or combination of methods (e.g., supervised learning, unsupervised learning, semi-supervised learning, etc.).

The online concierge system 102 applies the trained purchase model to items included in orders previously received from the user, determining a probability of the user purchasing different items included in orders previously received from the user. In some embodiments, the online concierge system 102 applies the trained purchase model to each item included in at least one order previously received from the user. Alternatively, the online concierge system 102 identifies a set of orders previously received from the user, such as orders received within a specific time interval (e.g., within a threshold amount of time from a time when the trained purchase model is to be applied). From the probabilities of the user purchasing different items included in orders previously received from the user, the online concierge system 102 selects 620 the set of items. In some embodiments, the online concierge system 102 ranks items included in prior orders based on the probabilities of the user purchasing the different items and selects 620 the set of items as items having at least a threshold position in the ranking. Alternatively, the online concierge system 102 selects 620 the set of items as items having at least a threshold probability of being purchased by the user.

The online concierge system 102 uses the selected set of items to identify a location of the selected warehouse 110. For each identified location of the selected warehouse 110, the online concierge system 102 determines 625 a predicted availability of each item of the set by applying the machine-learned item availability model further described above in conjunction with FIGS. 2, 4, and 5 to each item of the set in combination with an identified location of the selected warehouse 110. Application of the machine-learned item availability to the combination of an item and the identified location of the selected warehouse 110 generates a predicated availability of the item that is a probability of the item being availability at the identified location of the selected warehouse 110. From the predicted availability determined 625 for each item of the set at the identified location of the selected warehouse 110, the online concierge system 102 generates 630 an availability value for the identified location of the selected warehouse 110. In some embodiments, the online concierge system 102 averages the predicted availability for each item of the set at the identified location of the selected warehouse. The online concierge system 102 may apply a weight to predicted availabilities for items of the set, with a weight applied to the predicted availability for an item of the set based on a frequency of prior orders including the item of the set or based on a number of prior orders including the item of the set; using the weighted predicted availabilities of items in the set, the online concierge system 102 generates 620 the availability value for the identified location of the selected warehouse (e.g., by averaging the weighted predicted availabilities of items in the set). In other embodiments, the online concierge system 102 sums the precited availabilities for items of the set at the identified location of the selected warehouse 110 to generate 620 the availability value for the identified location of the selected warehouse 110; weights may be applied to the predicated availabilities for items of the set at the identified location of the selected warehouse 110 and the online concierge system 102 sums the weighted predicated availabilities for items of the set at the identified location of the selected warehouse 110 to generate 630 the availability value for the identified location of the selected warehouse 110.

Based on availability values generated 630 for each of the identified locations of the selected warehouse 110, the online concierge system 102 determines 635 a selected identified location of the selected warehouse 110. In various embodiments, the online concierge system 102 determines 635 the selected identified location of the selected warehouse 110 as an identified location of the selected warehouse 110 having a maximum availability value. Hence, the online concierge system 102 uses the availability values for different identified locations of the selected warehouse 110 that is most likely to have items of the set of items available for purchase. As the items of the set were selected based on prior orders of the user, the selected identified location of the selected warehouse 110 has a highest likelihood of having items that the user is likely to include in orders available for purchase. The online concierge system 102 retrieves 640 an inventory of items available from the selected identified location of the selected warehouse 110. For example, the online concierge system 102 retrieves 640 an inventory from the inventory database 204 associated with the selected identified location of the selected warehouse 110.

When the online concierge system 102 subsequently receives a query for items to include in an order, the online concierge system 102 compares the received query to the inventory associated with the selected identified location of the selected warehouse 110. This allows the online concierge system 102 to identify items available or offered by the selected identified location of the selected warehouse 110, which has a maximum likelihood of having items that the user is likely to order available for purchase.

Responsive to the online concierge system 102 being unable to retrieve 615 previously received orders for the user, the online concierge system 102 retrieves stored information identifying rates at which items included in previously received orders from other users were successfully purchased from each of the identified locations of the selected warehouse 110. For example, the online concierge system 102 determines orders received from other users within a specific time interval (e.g., within a week of receiving 605 the selection of the warehouse from the user) and that have been fulfilled from different locations of the selected warehouse 110. From the determined orders received form the other users, the online concierge system 110 determines a rate at which items included in the determined orders were purchased from different locations of the selected warehouse 110. For example, for an item, the online concierge system 102 calculates a number of orders fulfilled at an identified location of the selected warehouse 110 that included the item and a number of orders fulfilled at the identified location of the selected warehouse 110 for which the item was purchased, with the rate of the item being found at the identified location of the selected warehouse being a ratio of the number of orders fulfilled at the identified location of the selected warehouse 110 for which the item was purchased to the number of orders fulfilled at an identified location of the selected warehouse 110 that included the item. Based on rates at which different items were found at different identified locations of the selected warehouse 110, the online concierge system 102 determines 635 the selected identified location of the warehouse 110. For example, the online concierge system 102 aggregates (e.g., sums) rates at which different items were found across orders fulfilled at different physical locations of the selected warehouse 110 and determines 635 the selected identified location of the warehouse 110 as an identified location of the warehouse 110 having a maximum aggregated rate at which different items were found. As another example, the online concierge system 102 averages rates at which different items were found across orders fulfilled at different physical locations of the selected warehouse 110 and determines 635 the selected identified location of the warehouse 110 as an identified location of the warehouse 110 having a maximum average rate at which different items were found. Hence, the online concierge system 102 leverages information about rates at which items included in orders are successfully purchased from different identified locations of the selected warehouse 110 to determine 635 the selected identified location of the warehouse 110 when the online concierge system 102 has not received orders from the user. As the online concierge system 103 receives orders from the user, the online concierge system 102, determines 635 the selected identified location of the warehouse 110 from items previously ordered by the user, as further described above in conjunction with FIG. 6.

Figure 7:
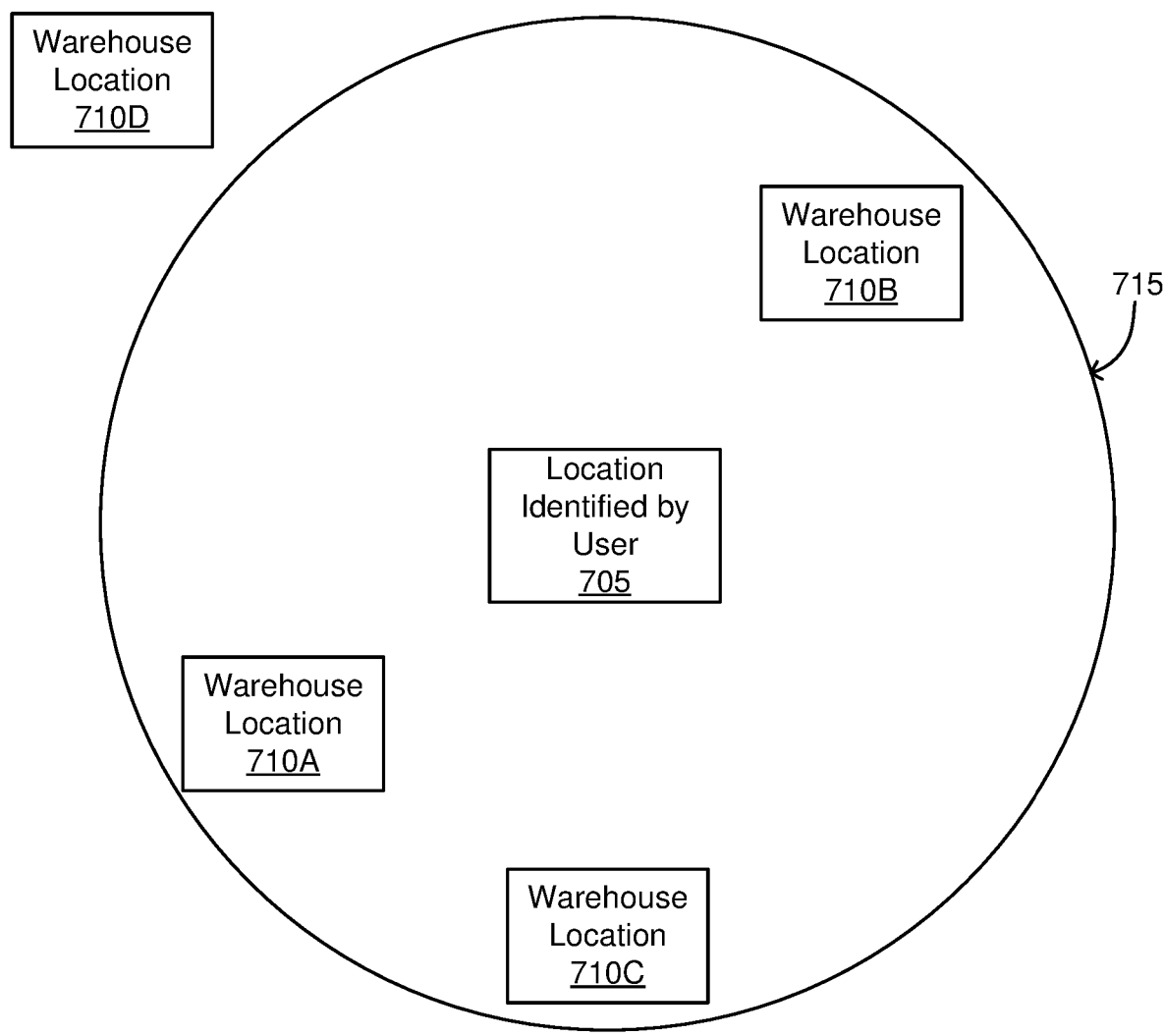
FIG. 7 is an example selection of a location of a warehouse for a user of an online concierge system, in accordance with an embodiment.

FIG. 7 is an example selection of a location of a warehouse for a user of an online concierge system 102. In the example of FIG. 7, the location 705 identified by the user is obtained by the online concierge system 102 when the user selects a warehouse 110 for creating an order via the online concierge system 102. The warehouse 110 selected by the user has multiple warehouse locations 710A, 710B, 710C, 710D, which correspond to different physical locations of the warehouse 110. As further described above in conjunction with FIG. 6, different warehouse locations 710A, 710B, 710C, 710D may have different inventories, so different warehouse locations 710A, 710B, 710C, 710D have different items available for the user to include in the order.

To maximize a likelihood of a warehouse location 710A, 710B, 710C, 710D used by the online concierge system 102 having items for fulfilling an order from the user, the online concierge system 102 identifies warehouse locations 710A, 710B, 710C, 710D within a threshold distance 715 of the location 705 identified by the user. In the example of FIG. 7, warehouse locations 710A, 710B, 710C are within the threshold distance 715 of the location 705 identified by the user, while warehouse location 710D is outside the threshold distance 715 of the location 705 identified by the user. Thus, the online concierge system 102 identifies warehouse locations 710A, 710B, 710C.

Additionally, the online concierge system 102 retrieves prior orders previously received from the user and identifies a set of items included in the prior orders previously received from the user. As further described above in conjunction with FIG. 6, the online concierge system 102 may apply a trained purchase model to items included in at least one prior order previously received from the user to determine a probability of the user purchasing the item. Based on the probabilities of the user purchasing items included in at least one prior order previously received from the user, the online concierge system 102 selects the set of items. For example, the online concierge system 102 ranks items included in at least one prior order previously received from the user based on their corresponding probabilities of being purchased by the user and selects the set of items as items having at least a threshold position in the ranking. As further described above in conjunction with FIG. 6, the online concierge system 102 may use any other suitable criteria to select the set of items from items included in at least one prior order previously received from the user.

For each of the identified warehouse locations 710A, 710B, 710C, the online concierge system 102 applies the machine learned availability model, further described above in conjunction with FIGS. 4 and 5, to each combination of an item of the set of items and an identified warehouse location 710A, 710B, 710C. Application of the machine learned availability model to a combination of a warehouse location 710A, 710B, 710C and an item determines a probability that the item is available at the warehouse location 710A, 710B, 710C. Hence, the online concierge system 102 determines a probability of each item of the set being available at warehouse location 710A and determines a probability of each item of the set being available at warehouse location 710B and at warehouse location 710C.

From the probabilities of each item of the set being available at each identified warehouse location 710A, 710B, 710C, the online concierge system 102 determines an availability value for each identified warehouse location 710A, 710B, 710C. For example, the online concierge system 102 determines the availability value for a warehouse location 710A as an average probability of items of the set being available at the warehouse location 710A or as a sum of the probabilities of items of the set being available at the warehouse location 710A. Determination of the availability value for an identified warehouse location 710A, 710B, 710C is further described above in conjunction with FIG. 6. The online concierge system 102 selects an identified warehouse location 710A, 710B, 710C having a maximum availability value and retrieves an inventory for the selected identified warehouse location 710A, 710B, 710C for fulfilling an order received from the user. In some embodiments, the online concierge system 102 selects a warehouse location 710A, 710B, 710C for the user based on alternative criteria a certain number of times when the user identifies the warehouse 110 having warehouse locations 710A, 710B, 710C, 710D, allowing the user to explore inventories available at different warehouse locations 710A, 710B, 710C, 710D. The online concierge system 102 may specify an exploration percentage and randomly use alternative criteria for selecting a warehouse location 710A, 710B, 710C, 710D over time, so a percentage of times the alternative criteria is used to select a warehouse location 710A, 710B, 710C, 710D during a particular time interval does not exceed the exploration percentage.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, at an online concierge system comprising at least one processor and memory:
   receiving a selection of a warehouse at the online concierge system from a user over a network, the warehouse having a plurality of locations offering items and the selection identifying a physical location;
   identifying, by the online concierge system, locations of the warehouse within a threshold distance of the location identified by the selection;
   retrieving, by the online concierge system, orders for one or more items the online concierge system previously received from the user;
   selecting, by the online concierge system, a set of items from items included in the orders previously received by the online concierge system from the user;
   for each identified location of the warehouse:
      determining, by the online concierge system, a predicted availability of each item of the set by the online concierge system applying a machine-learned item availability model to characteristics of an item of the set and to characteristics of an identified location of the warehouse, wherein the machine-learned item availability model is trained by:
         accessing, by the online concierge system, a dataset including a time and a warehouse associated with a previous order and item characteristics; and
         updating, by the online concierge system, the machine-learned item availability model by:
            identifying an item-warehouse pair;
            determining a confidence score associated with a probability that the item is available at the warehouse;
            collecting new information about the item responsive to the confidence score being lower than a threshold;
            updating the dataset with the collected new information; and
            retraining the machine-learned item availability model with the updated dataset;
      generating, by the online concierge system, an availability value for the identified location of the warehouse from the predicted availabilities of each item of the set for the identified location of the warehouse; and
   determining, by the online concierge system, a selected identified location of the warehouse from the availability values for each of the identified locations of the warehouse; and
   retrieving, by the online concierge system, an inventory of items available from the selected identified location of the warehouse.

2. The method of claim 1, wherein selecting the set of items from items included in the orders previously received by the online concierge system from the user comprises:
   determining a probability of the user purchasing different items included in the orders previously received by the online concierge system from the user by applying a trained purchase model to different items included in at least one order previously received by the online concierge system from the user; and selecting the set of items based on the determined probabilities.

3. The method of claim 2, wherein selecting the set of items based on the determined probabilities comprises:
 ranking items included in at least one order previously received by the online concierge system based on their corresponding probabilities; and
 selecting the set of items as items having at least a threshold position in the ranking.

4. The method of claim 2, wherein selecting the set of items based on the determined probabilities comprises:
 selecting the set of items as items having at least a threshold probability.

5. The method of claim 2, wherein determining the probability of the user purchasing different items included in the orders previously received by the online concierge system from the user by applying the trained purchase model to different items included in at least one order previously received by the online concierge system from the user comprises:
 identifying orders previously received by the online concierge system from the user during a specific time interval; and
 determining the probability of the user purchasing different items included in the identified orders previously received by the online concierge system during the specific time interval from the user by applying the trained purchase model to different items included in at least one identified order previously received by the online concierge system from the user during the specific time interval.

6. The method of claim 1, wherein selecting the set of items from items included in the orders previously received by the online concierge system from the user comprises:
 determining a frequency with which the user purchased each item included in at least one order previously received by the online concierge system from the user; and
 selecting the set of items as items having at least a threshold frequency.

7. The method of claim 1, wherein selecting the set of items from items included in the orders previously received by the online concierge system from the user comprises:
 determining a frequency with which the user purchased each item included in at least one order previously received by the online concierge system from the user;
 ranking the items based on their corresponding frequencies; and
 selecting the set of items as items having at least a threshold position in the ranking.

8. The method of claim 1, wherein identifying locations of the warehouse within the threshold distance of the location identified by the selection comprises:
 determining a geographic region maintained by the online concierge system including the location identified by the selection; and
 identifying locations of the warehouse within the determined geographic region.

9. The method of claim 1, further comprising:
 responsive to being unable to retrieve orders for one or more items the online concierge system previously received from the user,
  determining orders the online concierge system received from other users within a specific time interval and that have been fulfilled from the identified locations of the warehouse;
  for each of the identified locations of the warehouse, determining a rate at which items included in the determined orders were purchased from the identified locations of the warehouse; and
  determining the selected identified location of the warehouse as an identified location of the warehouse having a maximum rate at which items in the determined orders were purchased.

10. The method of claim 1, further comprising:
 receiving, at the online concierge system, a query for items to include in an order; and
 comparing, by the online concierge system, the received query to the inventory associated with the selected identified location of the warehouse.

11. A computer program product comprising a non-transitory computer readable storage medium having instructions encoded thereon that, when executed by a processor, cause the processor to:
 receive a selection of a warehouse at an online concierge system from a user, the warehouse having a plurality of locations offering items and the selection identifying a physical location;
 identify locations of the warehouse within a threshold distance of the location identified by the selection;
 retrieve orders for one or more items the online concierge system previously received from the user;
 select a set of items from items included in the orders previously received by the online concierge system from the user;
 for each identified location of the warehouse:
  determine a predicted availability of each item of the set by the online concierge system applying a machine-learned item availability model to characteristics of an item of the set and to characteristics of an identified location of the warehouse, wherein the machine-learned item availability model is trained by:
   accessing a dataset including a time and a warehouse associated with a previous order and item characteristics; and
   updating the machine-learned item availability model by:
    identifying an item-warehouse pair;
    determining a confidence score associated with a probability that the item is available at the warehouse;
    collecting new information about the item responsive to the confidence score being lower than a threshold;
    updating the dataset with the collected new information; and
    retraining the machine-learned item availability model with the updated dataset;
  generate an availability value for the identified location of the warehouse from the predicted availabilities of each item of the set for the identified location of the warehouse; and
 determine a selected identified location of the warehouse from the availability values for each of the identified locations of the warehouse; and
 retrieve an inventory of items available from the selected identified location of the warehouse.

12. The computer program product of claim 11, wherein select the set of items from items included in the orders previously received by the online concierge system from the user comprises:

determine a probability of the user purchasing different items included in the orders previously received by the online concierge system from the user by applying a trained purchase model to different items included in at least one order previously received by the online concierge system from the user; and select the set of items based on the determined probabilities.

13. The computer program product of claim 12, wherein select the set of items based on the determined probabilities comprises:

rank items included in at least one order previously received by the online concierge system based on their corresponding probabilities; and select the set of items as items having at least a threshold position in the ranking.

14. The computer program product of claim 12, wherein select the set of items based on the determined probabilities comprises:

select the set of items as items having at least a threshold probability.

15. The computer program product of claim 12, wherein determine the probability of the user purchasing different items included in the orders previously received by the online concierge system from the user by applying the trained purchase model to different items included in at least one order previously received by the online concierge system from the user comprises:

identify orders previously received by the online concierge system from the user during a specific time interval; and determine the probability of the user purchasing different items included in the identified orders previously received by the online concierge system during the specific time interval from the user by applying the trained purchase model to different items included in at least one identified order previously received by the online concierge system from the user during the specific time interval.

16. The computer program product of claim 11, wherein select the set of items from items included in the orders previously received by the online concierge system from the user comprises:

determine a frequency with which the user purchased each item included in at least one order previously received by the online concierge system from the user; and select the set of items as items having at least a threshold frequency.

17. The computer program product of claim 11, wherein select the set of items from items included in the orders previously received by the online concierge system from the user comprises:

determine a frequency with which the user purchased each item included in at least one order previously received by the online concierge system from the user;

rank the items based on their corresponding frequencies; and select the set of items as items having at least a threshold position in the ranking.

18. The computer program product of claim 11, wherein identify locations of the warehouse within the threshold distance of the location identified by the selection comprises:

determine a geographic region maintained by the online concierge system including the location identified by the selection; and identify locations of the warehouse within the determined geographic region.

19. The computer program product of claim 11, wherein the non-transitory computer readable storage medium further has instructions encoded thereon, that when executed by the processor, cause the processor to:

responsive to being unable to retrieve orders for one or more items the online concierge system previously received from the user, determine orders the online concierge system received from other users within a specific time interval and that have been fulfilled from the identified locations of the warehouse;

for each of the identified locations of the warehouse, determine a rate at which items included in the determined orders were purchased from the identified locations of the warehouse; and determine the selected identified location of the warehouse as an identified location of the warehouse having a maximum rate at which items in the determined orders were purchased.

20. The computer program product of claim 11, wherein the non-transitory computer readable storage medium further has instructions encoded thereon, that when executed by the processor, cause the processor to:

receive, at the online concierge system, a query for items to include in an order; and compare, by the online concierge system, the received query to the inventory associated with the selected identified location of the warehouse.

\* \* \* \* \*